United States Patent
Akiyama

(10) Patent No.: US 10,036,946 B2
(45) Date of Patent: Jul. 31, 2018

(54) LIGHT SOURCE DEVICE, ILLUMINATION DEVICE, AND PROJECTOR WITH SOLID-STATE LIGHT SOURCE AND COLLIMATOR LENS

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 5 days.

(21) Appl. No.: 14/958,448

(22) Filed: Dec. 3, 2015

(65) Prior Publication Data

US 2016/0170292 A1    Jun. 16, 2016

(30) Foreign Application Priority Data

Dec. 11, 2014  (JP) ................................. 2014-250892

(51) Int. Cl.
| | | |
|---|---|---|
| G03B 21/20 | (2006.01) | |
| G02B 27/09 | (2006.01) | |
| G03B 21/00 | (2006.01) | |
| G03B 33/06 | (2006.01) | |
| G03B 33/12 | (2006.01) | |

(52) U.S. Cl.
CPC ....... *G03B 21/208* (2013.01); *G02B 27/0961* (2013.01); *G03B 21/005* (2013.01); *G03B 21/204* (2013.01); *G03B 21/2033* (2013.01); *G03B 33/06* (2013.01); *G03B 33/12* (2013.01)

(58) Field of Classification Search
CPC .............. G02B 27/0961; G03B 21/005; G03B 21/2033; G03B 21/204; G03B 21/208; G03B 33/06; G03B 33/12
See application file for complete search history.

(56) References Cited

U.S. PATENT DOCUMENTS

| | | | | |
|---|---|---|---|---|
| 4,691,999 A * | 9/1987 | Wheeler | ............ | G02B 19/0033 359/641 |
| 6,344,929 B1 * | 2/2002 | Sugawara | ............ | G02B 27/283 348/E9.027 |
| 2009/0296222 A1 * | 12/2009 | Ganser | ................. | G02B 3/0062 359/622 |
| 2013/0321780 A1 * | 12/2013 | Miura | ................... | G02B 27/09 353/94 |

FOREIGN PATENT DOCUMENTS

| | | | | |
|---|---|---|---|---|
| JP | 2002239773 A | * | 8/2002 | ............ G02B 27/09 |
| JP | 2008-299063 A | | 12/2008 | |
| JP | 2012-063488 A | | 3/2012 | |
| JP | 2012-128999 A | | 7/2012 | |
| JP | 2012-156233 A | | 8/2012 | |
| JP | 2013-251222 A | | 12/2013 | |

* cited by examiner

*Primary Examiner* — Sultan Chowdhury
*Assistant Examiner* — Magda Cruz
(74) *Attorney, Agent, or Firm* — Oliff PLC

(57) ABSTRACT

The disclosure relates to a light source device including a solid-state light source, a collimator lens that receives a light beam emitted from the solid-state light source, and a beam width expansion element adapted to expand a beam width of the light beam from the collimator lens.

15 Claims, 4 Drawing Sheets

LIGHT SOURCE DEVICE, ILLUMINATION DEVICE, AND PROJECTOR WITH SOLID-STATE LIGHT SOURCE AND COLLIMATOR LENS

BACKGROUND

1. Technical Field

The present invention relates to a light source device, an illumination device, and a projector.

2. Related Art

In recent years, as an illumination device used for projectors, a device using a solid-state light source such as a semiconductor laser capable of providing high-intensity and high-power light has attracted attention. As such an illumination device, there has been known a device having a solid-state light source and a collimating lens for collimating a laser beam from the solid-state light source included in a package (see, e.g., JP-A-2012-128999 (Document 1)).

Incidentally, in the case of packaging the solid-state light source and the collimating lens, it is inevitable that some variation occurs in the alignment. In particular, in the collimating lens used for packaging as in the illumination device of Document 1 described above, the focal distance is set to be short. Therefore, there is a possibility that the emission direction of the laser beam significantly deviates from a design direction due to a significant influence of the alignment accuracy.

SUMMARY

An advantage of some aspects of the invention is to provide a light source device little in the deviation of the emission direction of the laser beam even in the case in which the alignment of the solid-state light source or the collimating lens is out of order. Another advantage of some aspects of the invention is to provide an illumination device equipped with the light source device and a projector equipped with the illumination device.

A first aspect of the invention provides a light source device including a solid-state light source, a collimator lens that receives a light beam emitted from the solid-state light source, and a beam width expansion element adapted to expand a beam width of the light beam from the collimator lens.

According to the light source device related to the first aspect of the invention, the composite focal distance of the collimator lens can be increased by expanding the beam width of the light beam using the beam width expansion element. Thus, the deviation of the emission direction of the light beam caused by the mounting error (alignment error) of the collimator lens or the solid-state light source is reduced.

The first aspect of the invention described above may adopt a configuration in which the beam width expansion element is formed of an afocal optical system.

According to this configuration, the deviation of the emission direction of the light beam can preferably be suppressed as described above.

The first aspect of the invention described above may adopt a configuration in which the beam width expansion element includes a first lens array unit and a second lens array unit.

According to this configuration, the deviation of the emission direction can be suppressed with respect to the light beams from a plurality of solid-state light sources.

The first aspect of the invention described above may adopt a configuration in which the first lens array unit is formed of a plurality of concave lenses, and the second lens array unit is formed of a plurality of convex lenses.

According to this configuration, since a Galileo type afocal optical system is constituted, the deviation of the emission direction of the light beam can be suppressed as described above.

The first aspect of the invention described above may adopt a configuration in which the first lens array unit is formed of a plurality of convex lenses, and the second lens array unit is formed of a plurality of convex lenses.

According to this configuration, since a Kepler type afocal optical system is constituted, the deviation of the emission direction of the light beam can be suppressed as described above.

The first aspect of the invention described above may adopt a configuration in which the first lens array unit and the second lens array unit are each formed of anamorphic lenses.

According to this configuration, for example, the shape of the light beam having been emitted from the solid-state light source can be corrected to a predetermined shape.

A second aspect of the invention provides an illumination device including the light source device according to the first aspect of the invention, and an overlapping optical system that receives the light beam emitted from the light source device.

According to the illumination device related to the second aspect of the invention, since the light beams having the deviation of the emission direction suppressed are made to efficiently overlap each other at a predetermined position, bright illumination light can be generated.

A third aspect of the invention provides a projector including the illumination device according to the second aspect of the invention, a light modulation device adapted to modulate illumination light from the illumination device in accordance with image information to thereby form image light, and a projection optical system adapted to project the image light.

According to the projector related to the third aspect, since the illumination device according to the second aspect of the invention is provided, it is possible for the present projector to project an image that is bright and superior in image quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will hereinafter be described in detail with reference to the accompanying drawings.

It should be noted that the drawings used in the following explanation show characteristic parts in an enlarged manner in some cases for the sake of convenience of easier understanding of the characteristics, and the dimensional ratios between the constituents and so on are not necessarily the same as actual ones.

First Embodiment

An example of a projector according to the present embodiment will be explained. The projector according to the present embodiment is a projection-type image display device for displaying a color picture on a screen (a projection target surface) SCR. The projector uses three liquid crystal light modulation devices corresponding respectively to colored light, namely red light, green light, and blue light. The projector uses semiconductor lasers capable of providing high-intensity and high-power light as light sources of an illumination device.

Figure 1:
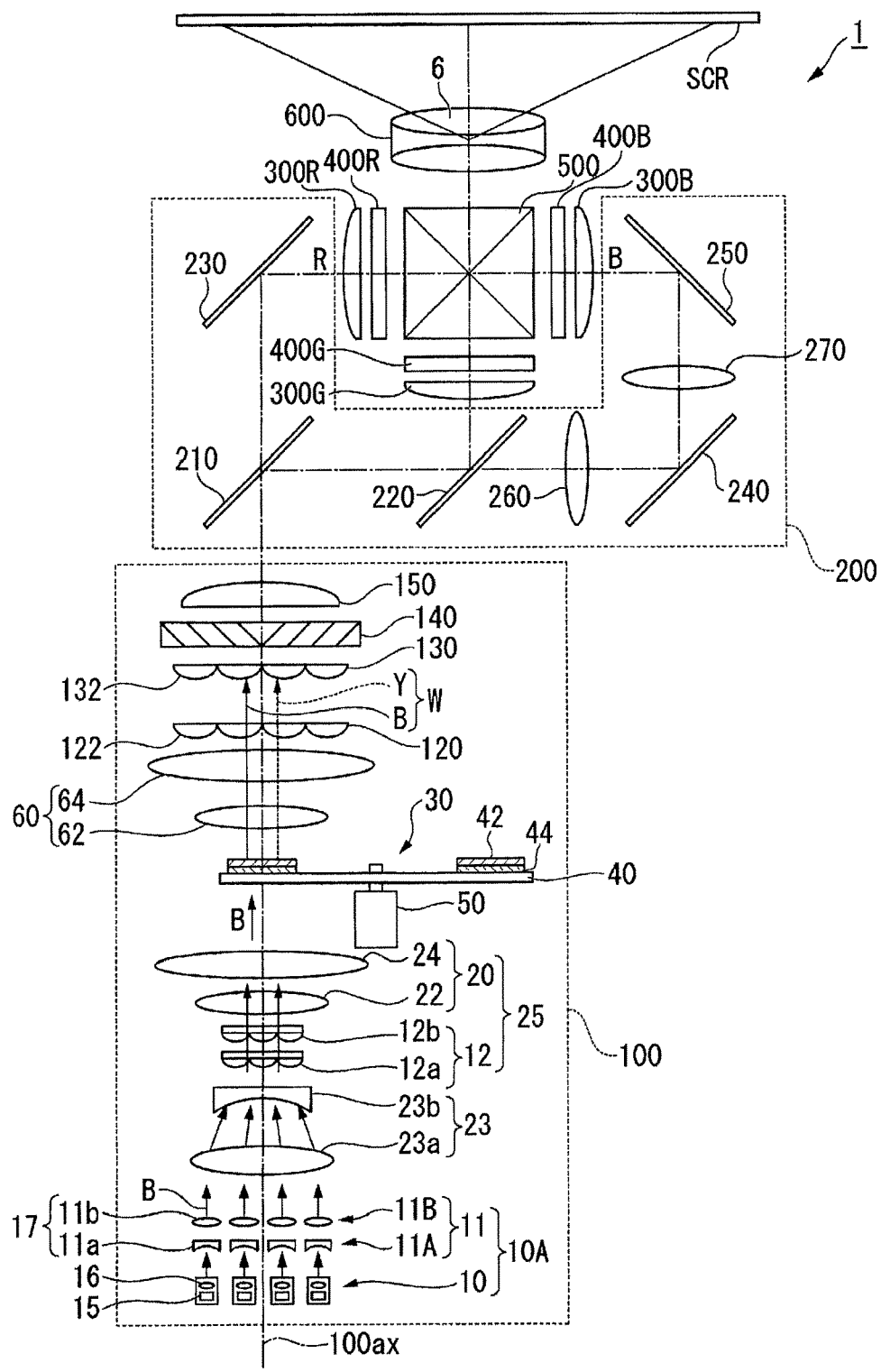
FIG. 1 is a top view showing an optical system of a projector according to a first embodiment.

FIG. 1 is a top view showing an optical system of the projector according to the embodiment.

As shown in FIG. 1, a projector 1 is provided with an illumination device 100, a color separation light guide optical system 200, liquid crystal light modulation devices 400R, 400G, and 400B, a cross dichroic prism 500, and the projection optical system 600.

The illumination device 100 is provided with the light source device 10A, an afocal optical system 23, an overlapping optical system 25, a rotary phosphor plate 30, an electric motor 50, a collimating optical system 60, a first lens array 120, a second lens array 130, a polarization conversion element 140, and an overlapping lens 150.

The light source device 10A is provided with a plurality of light sources 10 and an afocal optical unit (a beam width expansion element) 11. The plurality of light sources 10 is disposed in one plane perpendicular to an illumination optical axis 100ax so as to form an array. The light sources 10 each have a solid-state light source 15 and a collimator lens 16.

In the present embodiment, the light source 10 has a pedestal section not shown, and has a packaged structure in which the solid-state light source 15 and the collimator lens 16 are integrally held on the pedestal section.

The solid-state light source 15 is formed of a semiconductor laser for emitting a light beam (having a peak emission intensity at a wavelength of about 445 nm) formed of blue light B as excitation light. The collimator lens 16 is for converting the blue light B emitted from the solid-state light source 15 into parallel light. In the present embodiment, since the light source 10 is provided with a package structure, a collimator lens small in size and short in focal distance is used as the collimator lens 16.

The light source 10 is packaged in the state in which the collimator lens 16 and the solid-state light source 15 are aligned with each other so that the light beam is emitted toward a predetermined direction. It should be noted that it is also possible to adopt a semiconductor laser for emitting the blue light having a wavelength (e.g., 460 nm) other than 445 nm as the solid-state light source 15.

The afocal optical unit 11 includes a first lens array unit 11A and a second lens array unit 11B. The first lens array unit 11A is formed of a plurality of concave lenses 11a. The second lens array unit 11B is formed of a plurality of convex lenses 11b. The first lens array unit 11A and the second lens array unit 11B are arranged so that one of the concave lenses 11a and one of the convex lenses 11b are paired with each other, and thus, constitute a Galileo type afocal optical system. The afocal optical systems 17 each constituted by the concave lens 11a and the convex lens 11b are disposed so as to correspond respectively to the light sources 10.

Each of the afocal optical system 17 expands the beam width of the beam of the blue light B emitted from the corresponding one of the solid-state light sources 15. It should be noted that the structure of the afocal optical unit 11 is not limited to the Galileo type described above, but can also be, for example, a Kepler type optical system constituted by two convex lenses.

The afocal optical system 23 is, for example, a Galileo type optical system provided with a convex lens 23a and a concave lens 23b. The afocal optical system 23 shrinks the beam width of the beam (the beam formed of a plurality of light beams) of the blue light B emitted from the light source device 10A. Since the afocal optical system 23 shrinks the beam width of the excitation light (the blue light B) as described above, the overlapping optical system 25 small in size can be used. It should be noted that the structure of the afocal optical system 23 is also not limited to the Galileo type optical system described above, but can also be the Kepler type optical system.

The overlapping optical system 25 includes a homogenizer optical system 12 and a light collection optical system 20.

The homogenizer optical system 12 includes a first multi-lens array 12a and a second multi-lens array 12b. The light collection optical system 20 is provided with a first lens 22 and a second lens 24. The light collection optical system 20 is disposed in the light path from the homogenizer optical system 12 to the rotary phosphor plate 30, and makes the blue light (the excitation light) enter a phosphor layer 42 in a roughly collected state. In the present embodiment, the first lens 22 and the second lens 24 are each formed of a convex lens.

The homogenizer optical system 12 makes a plurality of small light beams emitted from the respective small lenses of the first multi-lens array 12a overlap each other on the phosphor layer 42 (described later) in cooperation with the light collection optical system 20. Thus, the light intensity distribution of the blue light B with which the surface of the phosphor layer 42 is irradiated is set to a homogenized state (a so-called top-hat distribution).

The rotary phosphor plate 30 has the phosphor layer 42 disposed on a circular disk 40, which can be rotated by the electric motor 50, along a circumferential direction of the circular disk 40.

The circular disk 40 is made of a material transmitting the blue light B. As the material of the circular disk 40, there can be used, for example, quartz glass, quartz crystal, sapphire, optical glass, and transparent resin.

In the present embodiment, the blue light B from the light source 10 enters the phosphor layer 42 from the circular disk 40 side, and then a part of the blue light B having entered the phosphor layer 42 is transmitted through the phosphor layer 42. Between the phosphor layer 42 and the circular disk 40, there is disposed a dichroic film 44 for transmitting the blue light B and reflecting fluorescence Y generated by the phosphor layer 42 due to the blue light B.

The phosphor layer 42 is excited by the blue light B having a wavelength of about 445 nm. The phosphor layer 42 is formed of a layer including, for example, $(Y, Gd)_3(Al, Ga)_5O_{12}$:Ce as a YAG phosphor.

The phosphor layer 42 converts a part of the blue light B from the light source 10 into the yellow fluorescence Y including the red light and the green light, and at the same time transmits the remaining part of the blue light B without converting the remaining part. In the present embodiment, among the blue light B from the light source 10, the blue light component having passed through the phosphor layer 42 is combined with the yellow fluorescence Y from the phosphor layer 42, and thus, white light W is generated.

Incidentally, in the case of packaging the solid-state light source 15 and the collimator lens 16 with each other as in the present embodiment, it is inevitable that some deviation occurs in the alignment of the solid-state light source 15 or the collimator lens 16. In other words, the light source 10 has a mounting error other than zero.

The collimator lens 16 in the present embodiment is short in the focal distance for the sake of expedience of being mounted on the light source 10 having a packaged structure, and is easily affected by the alignment accuracy. Therefore, in the light source 10 of the present embodiment, even in the case in which, for example, the mounting error is small, the blue light B is emitted toward the direction significantly deviated from the design direction of the light emission (the direction parallel to the illumination optical axis 100ax). In the case in which the emission direction of the blue light B is significantly deviated as described above, it becomes unachievable for the surface of the phosphor layer 42 to efficiently be irradiated with the blue light B, and therefore, it becomes unachievable to preferably generate the white light W as the illumination light.

Here, the mounting error of the light source 10 is denoted by the symbol Δ, the deviation of the blue light B from the design direction of the light emission (the angle with respect to the direction parallel to the illumination optical axis 100ax) is denoted by the symbol θ, and the focal distance of the collimator lens 16 is denoted by the symbol f. In this case, the mounting error is defined as Formula (1) below.

$$\Delta = f \cdot \tan \theta \quad (1)$$

As expressed by Formula (1), if the mounting error Δ of the light source 10 is constant, the longer the focal distance f of the collimator lens 16 is, the smaller the deviation angle θ of the blue light B is.

Since the light source 10 according to the present embodiment adopts the structure of packaging the collimator lens 16 and the solid-state light source 15 with each other, it is difficult to elongate the focal distance of the collimator lens 16.

Therefore, in the light source device 10A according to the present embodiment, the focal distance of the collimator lens 16 is converted by the afocal optical systems 17 (the afocal optical unit 11) disposed in the posterior stage of the light source 10 such that the focal distance of the collimator lens 16 increases.

In the present embodiment, the afocal optical systems 17 each expand the beam width of the blue light B from the light source 10. Expanding the beam width of the blue light B is equivalent to elongating the composite focal distance of the collimator lens 16. Therefore, as is understood from Formula (1) described above, the deviation θ of the light emission direction of the blue light B can be made relatively small.

Figure 2:
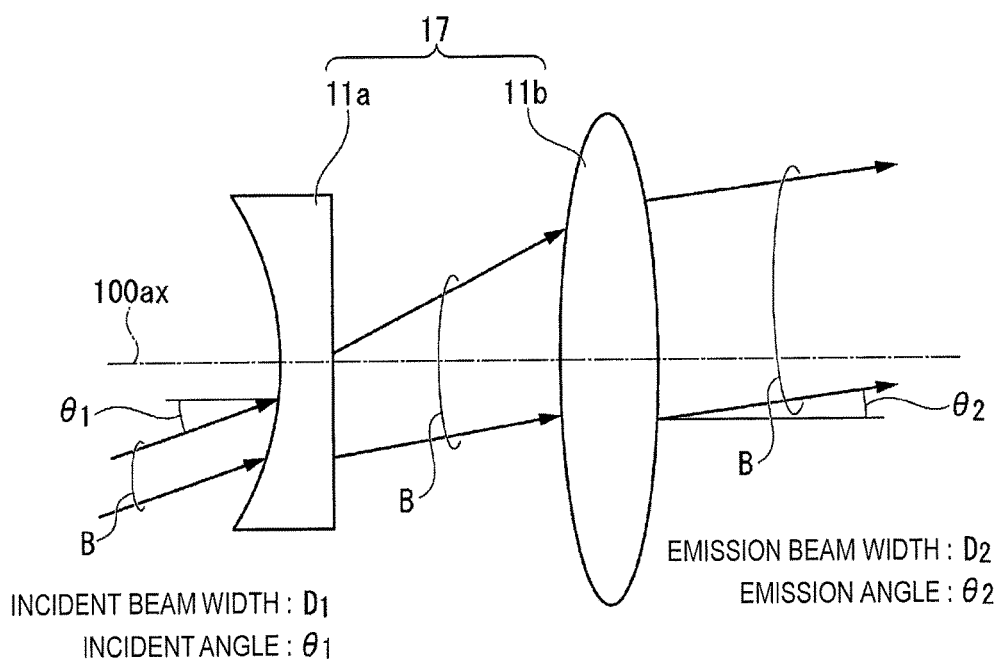
FIG. 2 is a diagram showing a feature of an afocal optical system according to the first embodiment.

FIG. 2 is a diagram showing a feature of the afocal optical system 17. In FIG. 2, the incident angle at which the blue light B from the light source 10 enters the concave lens 11a is denoted by the symbol $\theta_1$, and the beam width (incident light beam width) is denoted by the symbol $D_1$. The emission angle at which the blue light B is emitted from the convex lens 11b is denoted by the symbol $\theta_2$, and the beam width (emission light beam width) when being emitted is denoted by the symbol $D_2$.

Similarly to a general afocal optical system, each of the afocal optical systems 17 has a feature that the product of the incident angle of the light beam (the blue light B) and the beam width of the light beam (the blue light B) becomes constant in either of the case in which the light beam (the blue light B) enters the optical system 17 and the case in which the light beam (the blue light B) is emitted from the optical system 17.

The afocal optical system 17 expands the beam width of the blue light B, namely $D_2 > D_1$ is fulfilled. In this case, as shown in FIG. 2, the emission angle $\theta_2$ of the blue light B is smaller than the incident angle $\theta_1$ ($\theta_1 > \theta_2$).

In other words, according to the light source device 10A related to the present embodiment, even if the mounting error has occurred in the light source 10, the angle deviation of the emission direction of the blue light B caused by the mounting error can be decreased using the afocal optical system 17 disposed individually corresponding to the light source 10.

As described above, in the light source device 10A, it is possible to make the blue light B enter the afocal optical system 23 in the state of keeping the angle deviation of the emission direction of the blue light B decreased. Therefore, the blue light B shrunk via the afocal optical system 23 becomes to preferably enter a predetermined position of the overlapping optical system 25 (the homogenizer optical system 12). Therefore, it is possible for the homogenizer optical system 12 to preferably irradiate a predetermined area in the surface of the phosphor layer 42 in consort with the light collection optical system 20. Therefore, it is possible for the illumination device 100 to efficiently generate the fluorescence Y.

Going back to FIG. 1, the collimating optical system 60 is provided with a first collimating lens 62 and a second collimating lens 64, and roughly collimates the light from the rotary phosphor plate 30. The first collimating lens 62 and the second collimating lens 64 are each formed of a convex lens.

The first lens array 120 has a plurality of first small lenses 122 for dividing the light from the collimating optical system 60 into a plurality of partial light beams. The plurality of first small lenses 122 is disposed in a matrix in a plane perpendicular to the illumination optical axis 100ax.

The second lens array 130 has a plurality of second small lenses 132 corresponding to the plurality of first small lenses 122 of the first lens array 120. The second lens array 130 images the image of each of the first small lenses 122 of the first lens array 120 in the vicinity of each of the image forming areas of the liquid crystal light modulation devices 400R, 400G, and 400B in cooperation with the overlapping lens 150. The plurality of second small lenses 132 is disposed in a matrix in a plane perpendicular to the illumination optical axis 100ax.

The polarization conversion element 140 converts each of the partial light beams divided into by the first lens array 120 into a linearly polarized light beam.

The overlapping lens 150 collects each of the partial light beams from the polarization conversion element 140 to thereby make the partial light beams overlap the vicinity of the image forming areas of the liquid crystal light modulation devices 400R, 400G, and 400B. The first lens array 120, the second lens array 130, and the overlapping lens 150 constitute an integrator optical system for homogenizing the in-plane light intensity distribution of the light from the rotary phosphor plate 30.

The color separation light guide optical system 200 is provided with dichroic mirrors 210, 220, reflecting mirrors 230, 240, and 250, and relay lenses 260, 270. The color separation light guide optical system 200 separates the light from the illumination device 100 into the red light, the green light, and the blue light, and guides the red light, the green light, and the blue light to the corresponding liquid crystal light modulation devices 400R, 400G, and 400B, respectively.

Between the color separation light guide optical system 200 and the liquid crystal light modulation devices 400R, 400G, and 400B, there are disposed collecting lenses 300R, 300G, and 300B, respectively.

The dichroic mirror 210 is a dichroic mirror for transmitting the red light component and reflecting the green light component and the blue light component.

The dichroic mirror 220 is a dichroic mirror for reflecting the green light component and transmitting the blue light component.

The reflecting mirror 230 is a reflecting mirror for reflecting the red light component.

The reflecting mirrors 240, 250 are reflecting mirrors for reflecting the blue light component.

The liquid crystal light modulation devices 400R, 400G, and 400B are for modulating the respective colored light beams having input thereto in accordance with the image information to thereby form a color image. It should be noted that, although omitted from the drawings, the entrance side polarization plates are disposed between the collecting lenses 300R, 300G, and 300B and the liquid crystal light modulation devices 400R, 400G, and 400B, respectively, and the emission side polarization plates are disposed between the respective liquid crystal light modulation devices 400R, 400G, and 400B and the cross dichroic prism 500.

The cross dichroic prism 500 combines the image light beams emitted from the respective liquid crystal light modulation devices 400R, 400G, and 400B with each other to form the color image.

The cross dichroic prism 500 has a roughly rectangular planar shape composed of four rectangular prisms bonded to each other, and on the roughly X-shaped interfaces on which the rectangular prisms are bonded to each other, there are formed dielectric multilayer films.

The color image emitted from the cross dichroic prism 500 is projected in an enlarged manner by the projection optical system 600 to form an image on the screen SCR.

As described hereinabove, according to the projector 1 related to the present embodiment, since there is provided the illumination device 100 described above, which reduces the deviation of the emission direction of the blue light B caused by the mounting error of the light source 10 to thereby efficiently generate the fluorescence Y, it is possible for the projector 1 to display an image superior in quality.

Second Embodiment

Subsequently, a second embodiment of the invention will be explained.

The differences between the present embodiment and the first embodiment are the spot shape of the blue light emitted from the light source, and the structure of the afocal optical unit corresponding to the spot shape, and other parts of the structure are common to both of the embodiments. Therefore, in the following explanation, regions equivalent to those of the projector 1 shown in FIG. 1 are omitted from the explanation, and at the same time, denoted by the same reference symbols.

Figure 3:
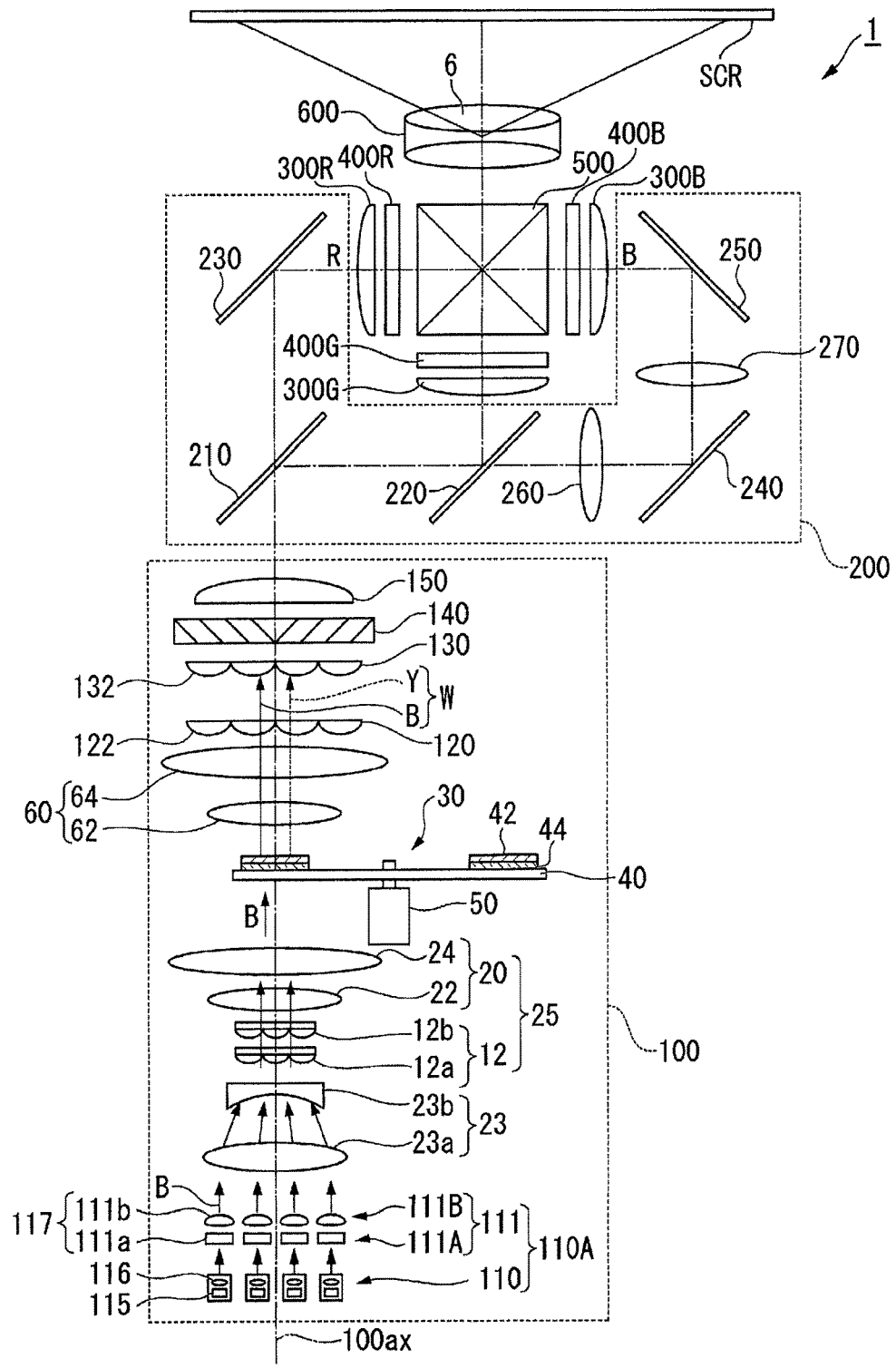
FIG. 3 is a diagram showing a schematic configuration of a light source device according to a second embodiment.

FIG. 3 is a diagram showing a schematic configuration of a light source device 110A according to the present embodiment.

As shown in FIG. 3, the light source device 110A according to the present embodiment is provided with a plurality of light sources 110 and an afocal optical unit (a beam width expansion element) 111. The plurality of light sources 110 is disposed in one plane perpendicular to the illumination optical axis 100$ax$ so as to form an array. The light sources 110 each have a solid-state light source 115 and a collimator lens 116.

Also in the present embodiment, the light source 110 has a pedestal section not shown, and has a packaged structure in which the solid-state light source 115 and the collimator lens 116 are integrally held on the pedestal section.

The solid-state light source 115 is formed of a semiconductor laser for emitting a light beam (having a peak emission intensity at a wavelength of about 445 nm) formed of blue light B as excitation light. The collimator lens 116 converts the blue light B emitted from the solid-state light source 115 into parallel light.

Figure 4A:
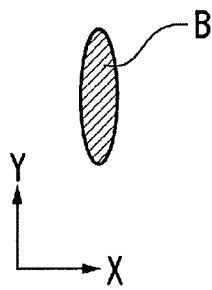
FIGS. 4A and 4B are diagrams each showing a spot shape of a beam of blue light.
Figure 4B:
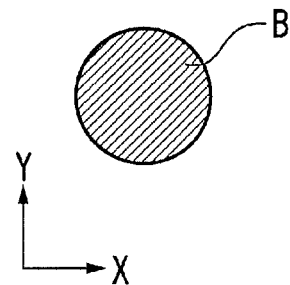

FIGS. 4A and 4B are diagrams each showing a spot shape of the beam of the blue light B. Specifically, FIG. 4A is a diagram showing the spot shape of the beam of the blue light B converted by the collimator lens 116 into the parallel light, FIG. 4B is a diagram showing the spot shape of the beam of the blue light B after passing through the afocal optical unit.

In the present embodiment, the blue light B having been converted by the collimator lens 116 into the parallel light has a roughly elliptical shape having the long axis in the Y direction and the short axis in the X direction as shown in FIG. 4A. It should be noted that although not shown in the drawings, the Z direction is parallel to the illumination optical axis 100$ax$.

Figure 5A:
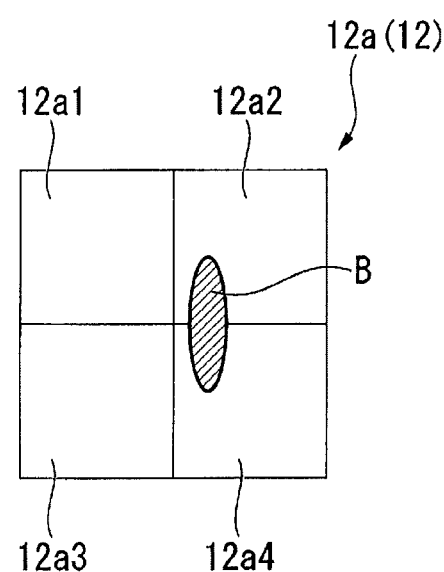
FIGS. 5A and 5B are diagrams each showing a state in which the blue light enters a first multi-lens array.
Figure 5B:
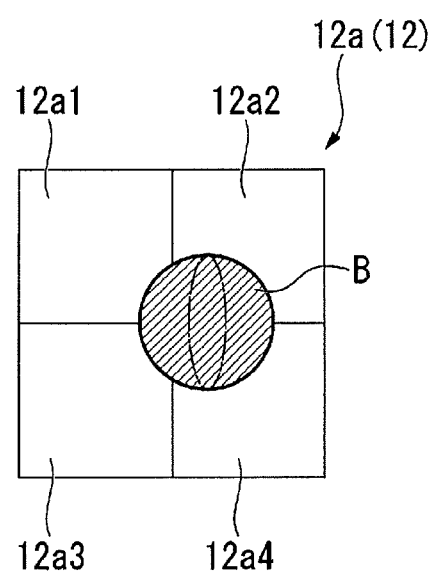

FIGS. 5A and 5B are diagrams each showing a state in which the blue light B enters a first multi-lens array 12$a$ of the homogenizer optical system 12. Specifically, FIG. 5A shows the state in which the blue light B having an elliptical shape has entered the first multi-lens array 12$a$ as a comparative example, and FIG. 5B is a diagram showing the state in which the blue light B having a roughly circular shape has entered the first multi-lens array 12$a$.

In order for the overlapping optical system 25 to make the blue light B preferably overlap with each other on the phosphor layer 42, it is necessary to make the spot of the blue light B formed on each of the small lenses of the homogenizer optical system 12 (first multi-lens array 12$a$) as large as possible.

As shown in FIG. 5A, in the case in which the blue light B having the roughly elliptical shape enters the homogenizer optical system 12, the blue light B enters only a small lens 12$a$2 and a small lens 12$a$4 among small lenses 12$a$1, 12$a$2, 12$a$3, and 12$a$4 of the first multi-lens array 12$a$. In this case, since only the blue light B having entered the small lenses 12$a$2, 12$a$4 is made to overlap the phosphor layer 42, a good light overlapping property has not been obtained.

Therefore, it is also possible to adopt a multi-lens array formed of small lenses smaller in size as the first multi-lens array 12$a$ in accordance with the spot shape of the blue light B. However, such small lenses smaller in size are extremely high in cost, and are not realistic.

In contrast, in the afocal optical unit 111 according to the present embodiment, a first lens array unit 111A and a second lens array unit 111B are each formed of anamorphic lenses. For example, the first lens array unit 111A is formed of a plurality of anamorphic lenses 111a, and the second lens array unit 111B is formed of a plurality of anamorphic lenses 111b.

The first lens array unit 111A and the second lens array unit 111B are arranged so that one of the anamorphic lenses 111a and one of the anamorphic lenses 111b are paired with each other, and thus, constitute an anamorphic afocal optical system. An anamorphic afocal optical systems 117 each constituted by the anamorphic lenses 111a and 111b are disposed so as to correspond respectively to the light sources 110.

In the present embodiment, since such anamorphic afocal optical systems 117 are provided, the blue light B emitted from each of the light sources 111 is subject to the lens effect only in a predetermined plane due to the anamorphic lenses 111a and 111b. Thus, the beam width of the blue light B expands, and at the same time the spot shape is expanded in the X direction as shown in FIG. 4B, and thus, the blue light B is converted into a roughly circular shape.

According to the present embodiment, it is possible for the anamorphic afocal optical system 117 to make the blue light B, which has the spot shape converted into the roughly circular shape, enter the homogenizer optical system 12. For example, as shown in FIG. 5B, in the case in which the blue light B having the roughly circular shape enters the homogenizer optical system 12, the blue light B enters all of the small lenses 12a1, 12a2, 12a3, and 12a4 of the first multi-lens array 12a. In this case, the blue light B having entered any of the small lenses 12a1 through 12a4 is made to overlap the phosphor layer 42.

Therefore, the homogeneity of the light intensity distribution of the blue light B with which the phosphor layer 42 is irradiated is enhanced, and thus, the fluorescence Y can efficiently be generated.

Further, also in the present embodiment, even if the mounting error has occurred in the light source 110, the deviation of the emission direction of the blue light B caused by the mounting error can be decreased using the anamorphic afocal optical system 117 disposed individually corresponding to the light source 110.

It should be noted that the invention is not necessarily limited to the embodiments described above, but a variety of modifications can be added thereto within the scope or the spirit of the invention.

For example, although in the embodiment described above, there is cited, as an example, the projector 1 provided with the three liquid crystal light modulation devices 400R, 400G, and 400B, the invention can also be applied to a projector for displaying a color image using a single liquid crystal light modulation device. Further, a digital mirror device can also be used as the light modulation device.

Further, although in each of the embodiments described above, there is described the example of mounting the illumination device according to the invention in the projector, the invention is not limited to the example. The illumination device according to the invention can also be applied to lighting equipment, a headlight of a vehicle, and so on.

The entire disclosure of Japanese Patent Application No. 2014-250892, filed on Dec. 11, 2014 is expressly incorporated by reference herein.

What is claimed is:

1. A light source device comprising:
a solid-state light source;
a collimator lens that receives a light beam emitted from the solid-state light source; and
a beam width expansion element that is formed of an afocal optical system and is adapted to expand a beam width of the light beam from the collimator lens,
wherein relative to an optical axis of the light source device, an angle at which the light beam is incident to the beam width expansion element is greater than an angle at which the light beam exits the beam width expansion element.

2. The light source device according to claim 1, wherein the beam width expansion element includes a first lens array unit and a second lens array unit.

3. The light source device according to claim 2, wherein the first lens array unit is formed of a plurality of concave lenses, and
the second lens array unit is formed of a plurality of convex lenses.

4. An illumination device comprising:
the light source device according to claim 3; and
an overlapping optical system that receives the light beam emitted from the light source device.

5. A projector comprising:
the illumination device according to claim 4;
a light modulation device adapted to modulate illumination light from the illumination device in accordance with image information to thereby form image light; and
a projection optical system adapted to project the image light.

6. The light source device according to claim 2, wherein the first lens array unit is formed of a plurality of convex lenses, and
the second lens array unit is formed of a plurality of convex lenses.

7. An illumination device comprising:
the light source device according to claim 6; and
an overlapping optical system that receives the light beam emitted from the light source device.

8. A projector comprising:
the illumination device according to claim 7;
a light modulation device adapted to modulate illumination light from the illumination device in accordance with image information to thereby form image light; and
a projection optical system adapted to project the image light.

9. The light source device according to claim 2, wherein the first lens array unit and the second lens array unit are each formed of anamorphic lenses.

10. An illumination device comprising:
the light source device according to claim 9; and
an overlapping optical system that receives the light beam emitted from the light source device.

11. A projector comprising:
the illumination device according to claim 10;
a light modulation device adapted to modulate illumination light from the illumination device in accordance with image information to thereby form image light; and
a projection optical system adapted to project the image light.

12. An illumination device comprising:
the light source device according to claim 2; and
an overlapping optical system that receives the light beam emitted from the light source device.

13. A projector comprising:
the illumination device according to claim 12;

a light modulation device adapted to modulate illumination light from the illumination device in accordance with image information to thereby form image light; and a projection optical system adapted to project the image light.

14. An illumination device comprising:

the light source device according to claim 1; and an overlapping optical system that receives the light beam emitted from the light source device.

15. A projector comprising:

the illumination device according to claim 14;

a light modulation device adapted to modulate illumination light from the illumination device in accordance with image information to thereby form image light; and a projection optical system adapted to project the image light.

* * * * *